(12) United States Patent
Krise et al.

(10) Patent No.: US 6,949,508 B1
(45) Date of Patent: Sep. 27, 2005

(54) MOLECULAR TAG READER

(75) Inventors: William F. Krise, Bozeman, MT (US); John L. Sternick, Mansfield, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 301 days.

(21) Appl. No.: 10/401,973

(22) Filed: Mar. 31, 2003

Related U.S. Application Data

(63) Continuation of application No. 09/756,102, filed on Jan. 9, 2001, now abandoned.

(51) Int. Cl.[7] .................. G01N 33/53; G01N 33/533
(52) U.S. Cl. ................ 514/2; 530/350; 530/402; 435/69.7; 435/968; 436/546; 436/800
(58) Field of Search .................. 514/2; 530/350, 530/402; 435/69.7, 7.5, 111, 968; 436/546, 436/800, 80

(56) References Cited

OTHER PUBLICATIONS

Krise, W. F. et al. (1998) (in "Fish Performance Studies" eds. Mackinlay, D. et al. "The efficacy of bath treatments and use of dimethyl sulfoxide in applying biochemical markers for stock identification Fish Performance Studies", pp. 81-89.*

* cited by examiner

Primary Examiner—Karen Cochrane Carlson
Assistant Examiner—Samuel W. Liu
(74) Attorney, Agent, or Firm—Mark Homer

(57) ABSTRACT

Foreign proteins are placed into the blood of an animal so that they can be recovered at a later time and used for identification. Proteins are administered to the animal from a water bath via the animal's gills (where appropriate), gut and, through the skin. The foreign protein is detectable in small amounts using immune assays which magnify the available signals or tags in an assay.

5 Claims, 5 Drawing Sheets

MOLECULAR TAG READER

This patent application claims domestic priority under 35 USC 120 that this application is continuation of Ser. No. 09/756,102 (now abandoned), filed Jan. 9, 2001.

FIELD OF THE INVENTION

The present invention relates to a biochemical marker used for tagging animals.

BACKGROUND OF THE INVENTION

For a variety of reasons, it is desirable to tag migratory animals, such as fish, so that the animals can be followed or tracked over a period of time. The conventional way of tagging animals is with a visible implant tag or a fluorescent colorant. For example, Haw et al., in U.S. Pat. No. 4,750,490, use visible implant tags to identify fish. The tags are implanted into transparent or semi-transparent tissue. When the fish is captured, the location of the visible implant tags can be ascertained visually and the tags can be excised and read or read through the transparent to semitransparent tissue.

Sandstrom et al., in U.S. Pat. No. 4,392,236, disclose an animal identification system using fluorescent implanted tags coded with one or more higher atomic number chemical elements and an automated method for reading the coded information.

Ekstrom, in U.S. Pat. No. 5,324,940, discloses an electronic identification system for identifying fish by implanting tags having identification codes of fluorescent colorants in the fish. The information encoded in the tags is obtained from the tags by measuring the spectrum of light emitted by the fluorescent colorants.

Biegel et al., in U.S. Pat. No. 5,235,326, describe an electronic identification system for identifying fish. The tags are comprised of capacitors, inductors, transistors, and possibly other solid-state devices packaged in a form adapted for attachment to or implantation in a fish.

Horan et al., in U.S. Pat. No. 4,762,701, disclose a method for tracking cells in vivo by labeling the cells with cyanine dyes and detecting the cells by measuring fluorescence, absorbance, or by detecting MRI probes included in the dyes.

Zohar et al., in U.S. Pat. No. 5,076,208, disclose a method for administering compounds such as protein to fish in an aquatic medium wherein the compound is added to the medium and ultrasound is applied to the medium to enhance or effect uptake of the compound by the animal. There is no indication that any of the compounds administered is for purposes of tagging or otherwise identifying the fish.

Conventional tags are either too large to be used with small fish (2.5 cm or smaller), or they are too expensive and involved, such as genetic markers, requiring samples from parents an progeny with the need for a thoroughly trained geneticist for interpreting the results.

However, it would be particularly useful to develop a method for marking larvae or fry of salmonids or other fishes to provide a practical means of stock identification over an extensive time period. Development of a fry marking system will enable fishery managers to determine fish origins, straying rates, and other definitive marking needs for identifying groups of fish stocked as fry.

Chemical marking methods typically have disadvantages of attenuation as the fish grows, or accumulation in hard tissues, requiring lethal sampling methods. Another drawback is less than 100% retention of the chemical mark.

A useful fry marking method should include non-lethal sampling procedures and development of simple field analysis techniques. Using protein as a marker in the blood stream could eliminate some of the disadvantages of attenuation because the signal in blood can be magnified with immunoassay, such as ELISA methods. The protein is not deposited in hard tissue, but in the blood, providing a non-lethal sampling method.

Fish traditionally have been exposed to biologically active proteins either via an injection or by immersion in a bath of treatment. Comparisons of blood titer from both methods gives an indication of the efficiency of protein delivery to the fish. To deliver proteins to fish too small for injections, a bath treatment is needed.

SUMMARY OF THE INVENTION

It is an object of the present invention to overcome the aforesaid deficiencies of the prior art.

It is another objection of the present invention to provide a method for marking fish fry that can be used for very small fish.

It is a further object of the present invention to provide a marker for fish and other animals that can be sampled in a non-lethal method.

According to the present invention, foreign proteins are placed into the blood, skin, or other surface tissues of an animal so that they can be recovered at a later time and used for identification. Proteins are administered to the animal from a water bath via the animal's gills (where appropriate), gut, and through the skin. The protein used, such as bovine serum albumin, is similar to fish serum albumin, is tolerated by the fish's immune system and is not entirely cleared from the blood stream. The foreign protein in the blood is detectable in small amounts using immune assays which "magnify" the available signal or tags or layers of proteins bound together (avidin/biotin binding) in an assay. The mark does not disappear in hard tissue, or require killing of the animal to remove otoliths or other tissues.

Other proteins that can be used are those which are tolerated by the immune system of the animal to be tested, e.g., avidin or avidin/biotin complexed bovine serum albumin.

The protein or other marker can be placed in the skin or body scales. The protein's presence is recognized by a non-toxic tag (fluorescent, biotin, or other dye) or the basic protein itself. Tags are important additions to the basic protein because they allow for increased numbers of identification by using different tags on the same protein.

While there is no limit to the type of sample that can be used, blood samples are easily used for detecting the proteins or tags. The proteins provide a long lasting mark in the animals as they grow.

While generally foreign proteins are not tolerated by the immune system and are cleared from the animal within 90 days, the proteins used in the present invention are still detectable in animals after two years. The molecular mark of the present invention resists attenuation or loss inside the animals tissues.

The marking system of the present invention will enable, for example, fishery managers to determine fish origins straying rates, and other definitive marking needs for identifying groups of fish stocked as fry. The marking system of the present invention includes non-lethal sampling procedures and simple field analysis techniques. Non-toxic, slowclearing, tagged proteins to tag batches of groups of small fish or other animals are used so that the molecular marks can be read as the fish or other animals grow. Tagged proteins, such as biotinylated bovine serum albumin, can form a chemical complex with avidin or other complex—former in blood or serum of the animal that is detectable at low levels.

Bath marking provides advantages such as non-lethal sampling, a simple and quick method for exposure, and a simple, inexpensive procedure for distinguishing stocks which does not require either sophisticated equipment or interpretation as with genetics differentiation (Nielsen, 1992). This method can use used for marking fry or larvae after hatching and before they being feeding, and can be used as a group mark rather than individual marks such as those which can be applied to juveniles such as coded wire tags, brands, or elastomer tags (Moffet et al., 1997, Dussault and Rodriguez, 1997).

DETAILED DESCRIPTION OF THE INVENTION

Figure 1:
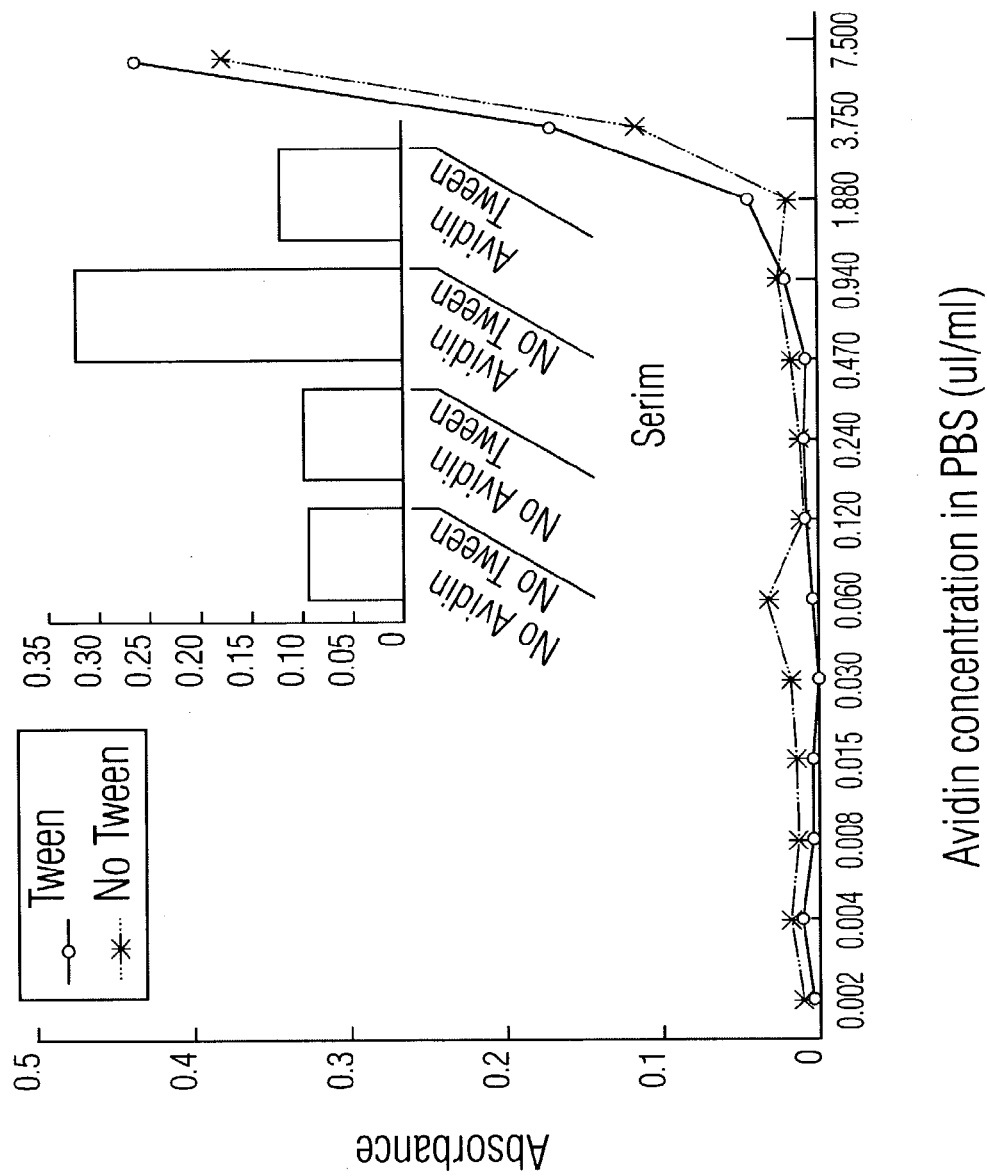
FIG. 1 shows a standard curve of avidin dilution and the effects of Tween 20 in ELISAs (Enzyme Linked Immunosorbent Assay) on serial dilution of avidin in PBS and Atlantic salmon serum.

Animals traditionally have been exposed to biologically active proteins either via an injection, or by immersion in a bath treatment. Comparisons of blood titer from both methods give an indication of the efficiency of protein delivery to the animal. For delivery of protein markers to fish which are too small for injections, it is necessary to use a bath treatment. Successful bath exposures of salmonids exposed at optimum water temperature result in high antibody concentrations about 30 days past exposure, with high immune titers lasting about 75 days (Anderson et al., 1979). Comparison of the two exposure methods, intra peritoneal injection and bath immersion, through 90 days post-treatment, gives an indication of effectiveness of exposure treatments.

The present invention thus provides a marking method which can be used for stock identification. The marking of fish fry less than 25 mm long requires that the foreign proteins be delivered by bath exposure rather than injections, primarily due to the size of the fish. Conventional chemical marking methods typically attenuate as the animal grows, or they accumulate in hard tissues, requiring lethal sampling methods, and there is much less than 100% retention of the chemical mark (Nielsen, 1992). By using a protein mark in the blood stream, the disavantages of attenuation are obviated because the signal can be modified in the blood using ELISA oz other immunoassay methods. The protein is not deposited in hard tissue, but rather in the blood, which means that non-lethal sampling methods can be used.

While other assay methods can be used to determine the marking protein, ELISA has been found to be the simplest and the most effective. Typical fluorescent tags such as Texas red, fluorescein (FITC), etc. are not as effective in assaying fish, because there is a natural fluorescence in fish blood over the ranges of these tag absorbances or emittances, leaving high background values in serum which makes detection more difficult. Thus, the tags used for fish assays should be those which do not absorb or emit in the ranges of the naturally occurring fluorescence in fish blood.

Materials and Methods

Atlantic salmon parr, mean length 104 mm and mean weight 13.0 g, were randomly separated into seven groups of 42 fish each, and each group was exposed to biotinylated bovine serum albumin either by intra peritoneal injection or by bath immersion. Four intra peritoneal treatments were given with 10, 25, 50, and 100 ug bovine serum albumin in 0.1 ml sterile distilled water. Thus, the protein was, administered at rates of 1.0, 2.5, 5.0, and 10.0 $\mu$g per fish. The fish were anesthetized in tricaine methanesulfonate, given the intra peritoneal injection with a 26 gauge needle, and placed into separate rearing units for each treatment group.

Three groups of fish were immersed in bath treatments at one of three bovine serum albumin concentrations: 5, 10, and 10 $\mu$g/ml. The bath treatments were given in polypropylene tubs with the fish held in nets within the tubs. The fish were lightly anesthetized prior to immersion to reduce stress. The immersion lasted for seven minutes, after, which the fish were placed into separate 43 L glass rearing units with a 4 L/minute flow of 9° C. water.

Fish given DMSO (dimethyl sulfoxide) baths of 0, 1, 2, and 4% DMSO were lightly anesthetized and placed into a polypropylene tub fish were held in a net and immersed into protein bath for eight minutes. Groups of 45 to 50 fish were marked in one of three ways:

1. Group 1 was immersed in a 10 $\mu$g/ml bovine serum albumin bath, rinsed, and removed;
2. Group 2 was immersed in a 10 $\mu$g/ml bovine serum albumin bath, rinsed 3–5 minutes, and immersed in a second bath of 3.3 $\mu$g/ml FITC-avidin with DMSO used only in the first bath (bovine serum albumin),
3. Group 3 was given the same double bath treatments of bovine serum albumin and avidin as the second group except that DMSO was used in both the first and second baths.

Once the bovine serum albumin bath or double bath treatments were complete, the fish were placed into rearing tanks as in the above study, and held for 90 days. Blood was sampled on days 10, 30, 40 and 90 after exposure to the baths. Samples from both tests were collected in the same manner.

Blood samples from fish in both tests were collected from anesthetized fish (n=10 per treatment) 10, 30, 0.40, and 90 days after administration of treatments. The blood was refrigerated 4.6 hours, centrifuged for 8 minutes at 13,000 rpm, the serum removed and stored frozen until assayed for bovine serum albumin by ELISA. Fluorescence assays for FITC on a Perkin Elmer HTS 7000 microplate reader were inconclusive.

The ELISA procedure for all tests was for detection of bovine serum albumin and included positive controls of phosphate buffered saline (PBS), bovine serum albumin added at one or more of five concentrations: 1.90, 1.00, 0.50, 0.25, and 0.10 mg/ml. Serum or controls were adjusted to minimum volume of 100 µL with phosphate buffered saline, then diluted by half in phosphate buffered saline, added to wells of a 96-well microplate (100 µL/well) and incubated in a refrigerator overnight. Absorbances were adjusted to the ratio of phosphate buffered saline added to serum before the 1:1 dilution with phosphate buffered saline.

The serum and controls were warmed to room temperature the next day, and the serum and controls were removed and the plates washed with PBS five times. The plates were then blocked witih 280 µL per well of casein blocking buffer (Pierce, Rockford, Ill.) and incubated for 45 minutes. The previous wash procedure was repeated with 50 µL Tween 20 added to the PBS. After washing, 2 drops (80 µL) of ABC complex (Pierce, Rockford, Ill.) were added to each well and the plates were incubated for 20 minutes. The plates were washed again five times with BPS-T233n, substrate was added (TMB Substrate, Pierce, Rockford, Ill.), and the plates were read at five minute intervals. The 20-minute reading was selected for providing peak readings. Absorbance was read on a Dynatch MR 580 (Chantilly, Va.) microplate reader.

Before statistical tests were conducted, results from the different ELISAs were standardized to remove differences, which could occur among plates run at different times. To do this, posive control absorbance values were set at 1.000, and all absorbances were algebraically adjusted the same amount needed to set the negative control serum absorbance to zero. An absorbance ratio was then calculated by dividing the absorbance value of each data point (mean of duplicate wells) by the positive control value. SAS statistical procedures were used for all analyses (SAS Institute, 1987).

For the first study, of bath and injection methods, two-way analysis of variance was used to determine differences among treatment means using bath or injection treatment level, and sample data as variables. For the DMSO data set, three-way analysis of variance was used using percentage of DMSO; single/double bath treatments, and sample data as variables. The Duncan's Multiple Range Test was used to determine significant differences among treatments for the two-way analysis, and the Ryan-Einot-Gabriel-Welsch Multiple F Test was used for the three-way analysis. All tests were performed at the 0.05 level of significance.

Bath/Injection Study

ELISA absorbance from serum samples collected 10 days exposure showed high variability within treatment groups, and mean absorbances were statistically the same for fish given either injection or bath treatments of bovine serum albumin, as show in FIG. 1. At this stage, several of the fish tested had low response to the antigen regardless of its presentation or concentration.

Absorbance values 30 days post-exposure were also not significantly different among any of the bath or injection treatments (cf. FIG. 1). The 40-day sample showed that the mean absorbance levels were either similar to or slightly lower than those from fish 30 days post-exposure Relationships with treatments remained the same as in previous treatments (FIG. 1).

Figure 2:
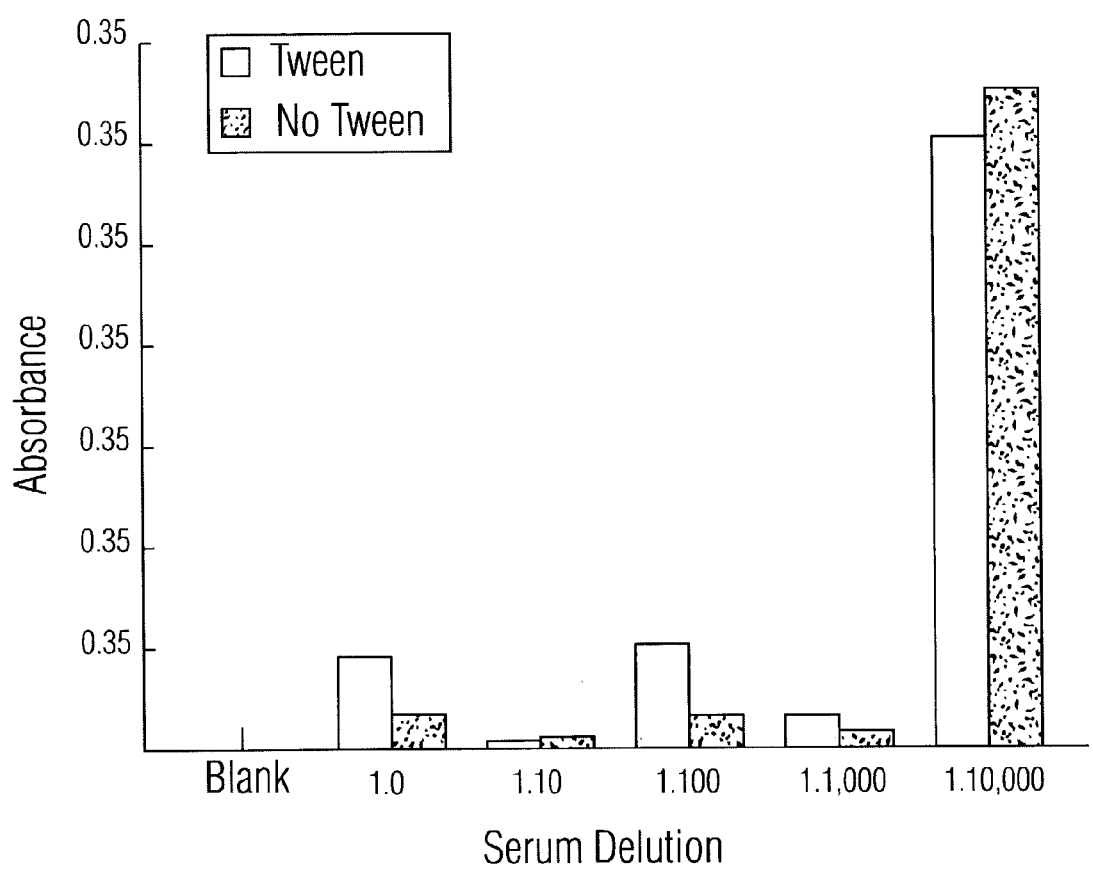
FIG. 2 shows serial dilution of Atlantic salmon serum to show the point of nonspecific protein binding of the ELISA (1:10,000).

One significant peak in absorbance occurred in the 10 ug/ml bath group at 40 days post-treatment, as shown in FIG. 2. The overall mean absorbances for all bath groups and all injection groups were nearly the same, as shown in FIG. 2.

Figure 3:
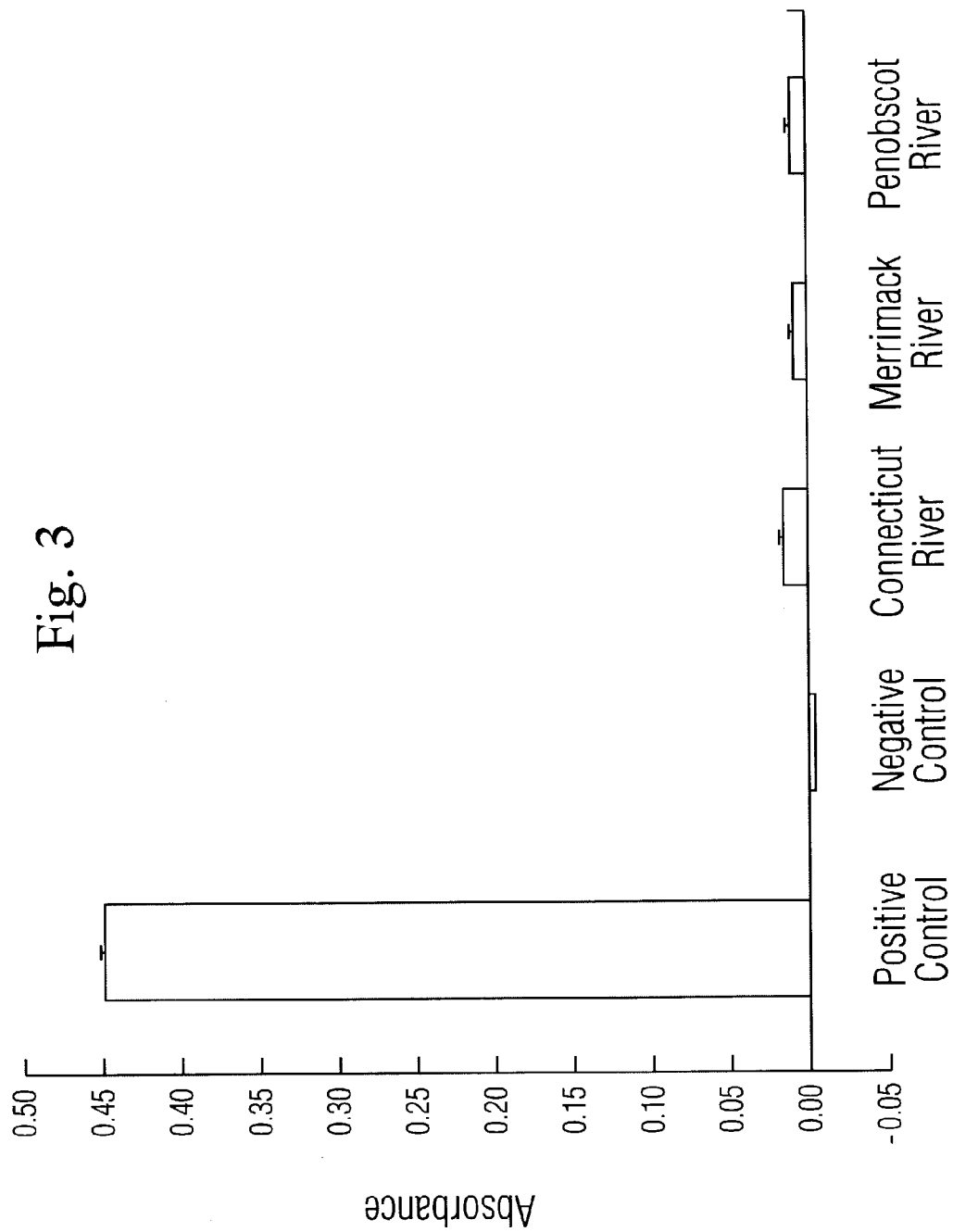
FIG. 3 shows the mean ELISA absorbances to a specific assay for biotinylated bovine serum albumin in Atlantic salmon sea-run adults from the Connecticut, Merrimack, and Penobscot rivers.

The 90 day sample yielded results similar to those of the previous sample dates, except that it was at significantly lower absorbance levels than either the 40 day bath group or the 30 and 40 day injection groups, as shown in FIG. 3. There were no significant differences among treatments for either serum concentration of bovine serum albumin in bath or injection treatments. Concentrations from all levels of bovine serum albumin yielded similar mean serum concentrations between 10 and 20 times those of negative control serum. Further results showed that serum levels were significantly higher on day 40 (0.492) than on days 10 (0.310) and 90 (0.127), lowest on day 90, and that day 30 absorbance ratios (0.426) were not significantly different from those on days 10 or 40.

DMSO and Double Mark Study

Figure 4:
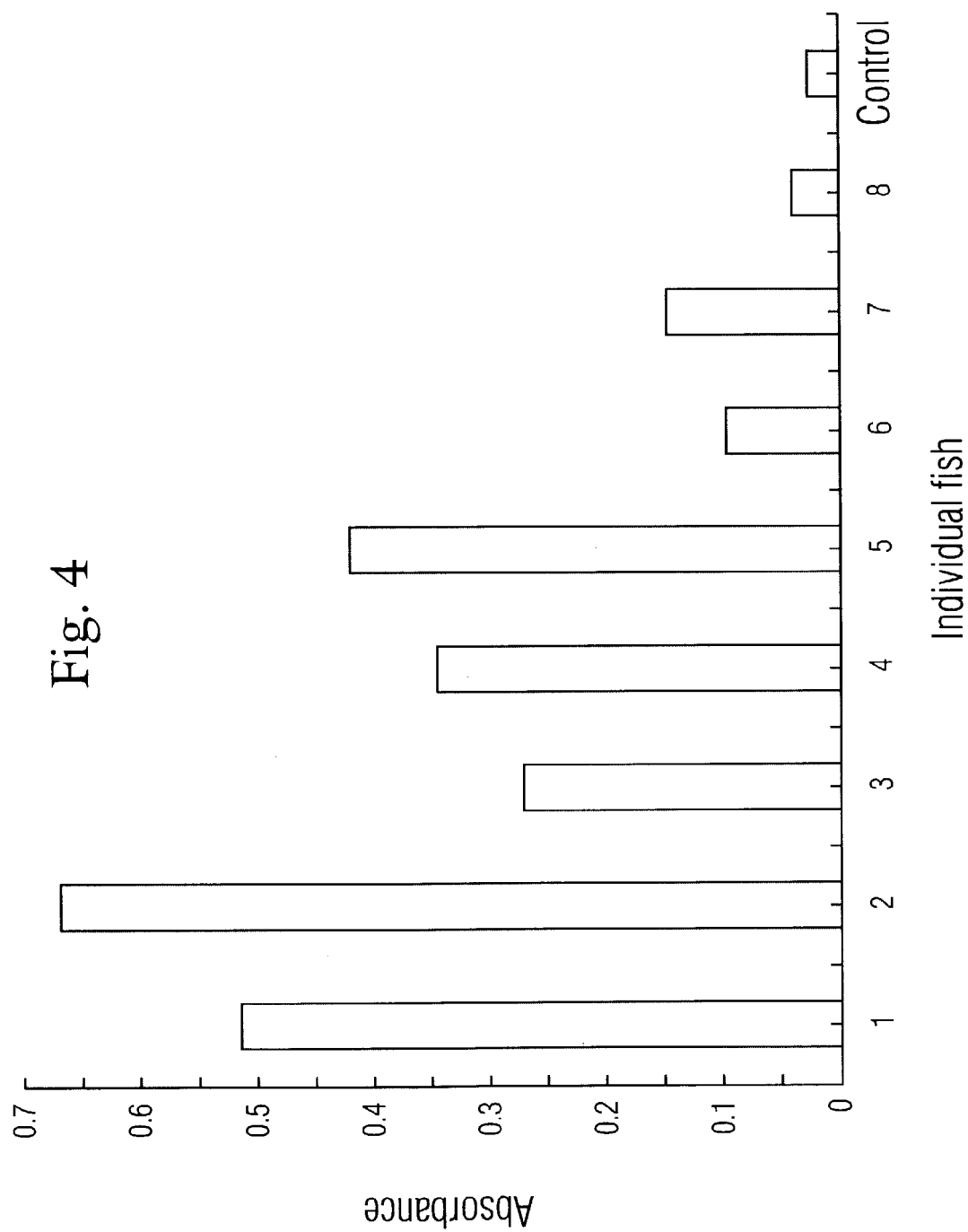
FIG. 4 shows serum titres of eight juvenile Atlantic salmon 15 months after exposure to biotinylated bovine serume albumin as fry. Negative control serum absorbance was 0.022.

There were no significant differences in the main effects among any of the DMSO levels at any sampling date, as shown in Table 1. One significant difference occurred among Atlantic salmon of bovine serum albumin or bovine serum albumin/avidin complex due to DMSO, which was a higher absorbance ratio where DMSO was used in both baths of the double bath group (2.275) than in the bovine serum albumin group (1.701). The double mark group with DMSO used only for the first bath (1.867) was not different from either of the other treatments, as shown in FIG. 4. This block includes data from all levels of DMSO from 0 to 4%. There were also significant differences among sample times, due to high readings on day 90 (4.004), which resulted from the use of different negative control serum that gave high background absorbance and altered the standardization procedure results. Mean sample absorbances for the day 90 data were within the same range as those from all other sample days prior to standardization (day 10, 0.578; day 20, 0.784; day 40, 0.642; day 90, 0.674). The range of mean absorance ratios for 10, 30 and 40 days were 0.794, 1.202 and 1.790, respectively, providing a similar pattern to those from the bath/injection comparison. The standardization procedure yielded mean day 90 absorbance ratios of 4.048, much higher than those of earlier samples.

The results of this study indicate that juvenile Atlantic salmon were able to achieve similar concentration of bovine serum albumin over a range of injection rates and bath treatment concentrations. Effective bath treatments for antigen entry into fish have been given with as little as two minutes exposure time (Anderson et al., 1979; Zapata et al., 1987) with varied dosages of antigen from 1 to 1000 uL. Anderson et al. (1979) found that a 10 µg/mL concentration of *Yersinia ruckeri* O-antigen was sufficient to produce a response. It has now been found that a 7–8 minute exposure time to bovine serum albumin was long enough for sufficient bovine serum albumin to be taken up and remain in Atlantic salmon.

Atlantic salmon are immunocompetent at the end of the yolk-sac absorption period with membrane IgM present on lymphocytes (Ellis, 1977). Similarly, other salmonid species are immunocompetent at the end of the yolk absorption period, such as the chum salmon (Oncorhynchus keta, Nagae et al., 1993), or the rainbow trout (Oncorhynchhusmykiss, Tatner, 1986). Immunocompetence at the prefeeding stage in salmonids allows the use of protein bath treatments for marking salmonid fry and allows the marked fish group to be identified later. One skilled in the art can, without undue experimetnation, readily establish exposure concentrations for marking fry.

The most important aspect of the functioning immune system and the administration of a biochemical marker, such as a protein such as bovine serum albumin, is the fact that the protein is tolerated, or ignored, by the animal's immune system, so that the protein remains within the blood stream for a significant amount of time. Reasonable levels of bovine serum albumin were found in salmon 90 days after exposure, which is what would have been the end of the humoral immune response period (Anderson et al., 1979). This may indicate that bovine serum albumin remains after the humoral response. Other data shows this to be true for as long as 30 months in fish currently under a long term study.

Figure 5:
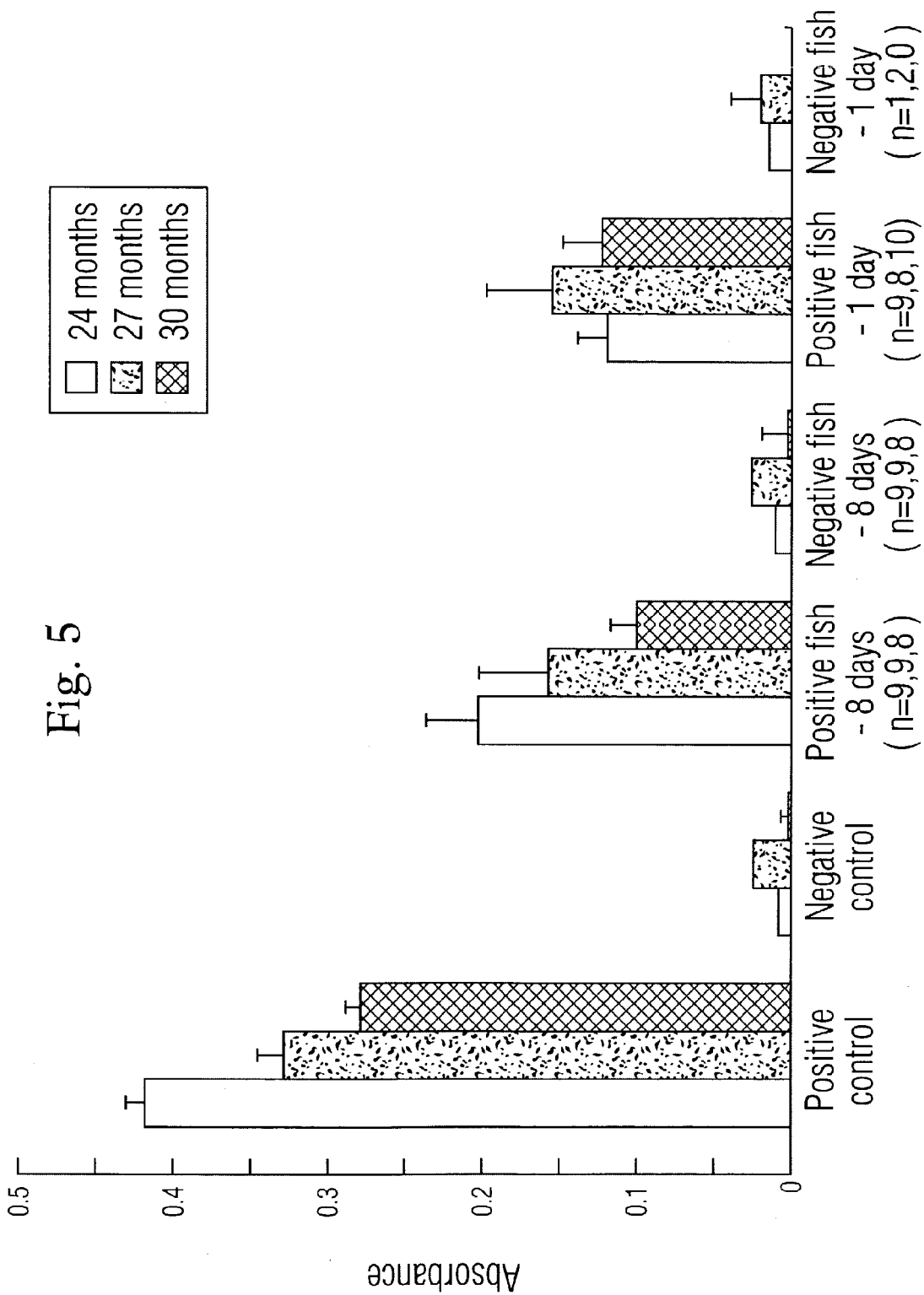
FIG. 5 shows mean ELISA absorbances (+SEM) of Atlantic salmon serum for the presnce of biotinylated bovine serum albumin baths 24, 27, and 30 months after exposrue. Salmon fry were exposed 8 and 1 days before yolk absorption.

One of the biggest advantages of the method of the present invention over conventional methods is that the method can be used over a prolonged period of time. As shown in FIG. 5, in 80 to 1000% (mean to 90% at 30 months) of the fish sampled, protein retention in serum still occurs at 30 months after bath treatment. In this case, salmon fry were exposed 8 and 1 days before yolk absorption. Thus, it is clear that the present method can be used for stock identification for up to about three years.

Because protein markers may enter fish through several routes, it is believed that fry or alevins would be able to produce an appropriate response to the challenge in a bath. Assuming that the humoral immune response is functional in salmonid fry by the time fish begin exogenous feeding. [Ellis, 1977, Atlantic salmon, Nagae et al., chum salmon; Fuda et al., 1991, masu salmon (*Oncorhynchus mnasou*); Tatner 1986, and Castillo et al., 1993, rainbow trout], then the routes of protein entry into a fry are important in the fish's uptake and processing of a foreign protein. Entry routes could include the gills, skin, and the gastrointestinal tract. Antigen entry through the gills was shown for juvenile Atlantic salmon in a two minute bath of *Yersinia ruckeri* Oantigen (Zapata et al., 1987) and for rainbow trout in a one hour bath of *Flavobacterium branchiophilium*. Ototake et al. (1996) found that rainbow trout take up antigen through the skin, using bovine serum albumin after exposing 15 juvenile trout to 2% concentrations of bovine serum albumin in three minute baths. Lastly, Robohm and Koch (1995) showed that a major route of uptake of antigen also occurs through the gastrointestinal tract. The authors plugged the esophagus of fish and showed greatly reduced uptake of *Clostridium botulinum* toxin. In bath exposures as described herein, Atlantic salmon could take up bovine serum albumin in any or all of these routes, allowing for the partitioning of bovine serum albumin within the fish.

Some variation in bovine serum albumin uptake and processing experienced in the fish could be explained by the that the fish were anesthetized to administer the mark, or that genetic differences among fish could result in different protein retention levels. Lobb (1987', found that channel catfish (*Ictalurus punctatus*) had depressed antigen uptake due to anesthesia. Genetic differences in hemolytic oz lysozyme activity have been shown for rainbow trout and Atlantic salmon (Roed et al., 1990; Roed et al., 1992; Roed et al., 1993, and Lund et al., 1995). Differences among genetics of individual fish studied could have led to their variation in response. However, it appears that different individual fish responses to anesthesia were probably the largest cause of variability among treatment groups.

It was found that juvenile Atlantic salmon could take up and store bovine serum albumin effectively through bath treatments ranging from 5 to 20 µg/ml beyond a 75–80 day humoral immune response period. Concentrations of bovine serum albumin assimilated by a wide range of bath concentrations (5–10 µg/ml were statistically the same as those from fish given intra peritoneal injections of bovine serum albumin. There appears to be large variability in forgiveness in an effective protein dose rate for a bath treatment. The use of DMSO in bath treatments only significantly improved the uptake of proteins in a double bath procedure of two agglutinating proteins when DMSO was used in treatment baths. Exposure of Atlantic salmon to a foreign protein bath thus provides an effective method of marking small fish for stock identification.

A wide range of concentrations of proteins can be used in the present invention, although concentrations of from 1 to 5 mg/ml of bovine serum albumin are adequate. Different concentrations of the protein are not significantly different in effectiveness from one another.

The trays in which the fish are immersed in the protein bath are preferably those to which the proteins do not stick. While polypropylene is the preferred material for the pans, fiberglass incubation trays can also be used.

The optimum temperature for treatment should be the same as optimum temperatures of rearing of the species treated. For example, temperature ranges for salmonids would be from 5 to 18° C., depending upon the species. The use of water temperature on a species' outer range of tolerance can reduce protein uptake.

Immunoassay Procedures

Several in vitro ELISAs were performed with Atlantic salmon blood, serum, and with phosphate buffered saline (PBS) as control. These media carried various concentrations of bovine serum albumin, or avidin (Pierce, Rockford, Ill.). ELISA procedures are described according to the type of result anticipated for each. Some procedures are common to assays and will be abbreviated after their first description.

Determination of Bovine Serum Albumin Coupled to Avidin in Serum or Blood.

Three concentrations of bovine serum albumin (0.090 or 0.048 µg/mL, 0.024, and 0.006 µg/ml bovine serum albumin) were added to whole blood or serum pooled from 12–20 juvenile Atlantic salmon and used in an ELISA for bovine serum albumin. Two to three mL of blood was collected from two year old Atlantic salmon anesthetized in methane tricaine sulfonate from caudal puncture in 3 cc syringes, and pooled into 20 ml samples one hundred uL of heparin, 250 units/ml, was added to whole blood to prevent clotting, and blood used for serum collection (no heparin added) was refrigerated overnight and centrifuged for ten minutes at 13,000 rpm to separate serum from blood cells. After separation, the serum was drawn off and stored frozen until use.

In the assays described herein, 25 µg/mL avidin was added to the blood or serum and PBS control. After the addition, of avidin, three separate samples of 100 µL of one of three concentrations of bovine serum albumin, 1.900, 0.500 and 0.125 mg/ml, was added, giving a final bovine serum albumin concentration of 90, 24, or 6 µg/ml. The solutions were allowed to incubate at room temperature for 15 minutes, then 100 µL volumes were transferred in triplicates to a 96 well microplate (Nunc, Immunolon 4 microplate). Following a 45 minute room temperature incubation, the wells were washed five times with distilled water. Casein blocker (Pierce, Rockford, Ill.) was then added to the wells in the amount of 280 µL/well, and blocking was allowed for 40 minutes. The rinse procedure followed, then horseradish peroxidase conjugated biotin was added. A 20 minute incubation followed, then a rinse, and the addition of 3,3',5,5'-tetramethyl benidine (TMB substrate, Pierce, Rockford, Ill.). Absorbances were read with a Dynatech MR580 (Chantilly, Va.) microplate reader every 5 minutes for 40 minutes. This was the standard ELISA for bovine serum albumin.

A second test was conducted using the same procedure except for an extended incubation time to 90 minutes after the addition of blood or serum containing avidin and bovine serum albumin.

Serial Dilution of Avidin to Determine Lowest Levels Detectable by ELISA.

To detect the lowest levels, of avidin in serially diluted samples, of PBS, beginning with a stock solution of 7.5 µL/ml avidin, twelve dilutions were made from the stock solution, each cutting the concentration of avidin in the previous solution by half. The assay was run in duplicate sets of avidin dilutions in PBS to test for differences between the use, or lack, of 50 µL/ml Tween 20 (Sigma Chemical Company, St. Louis, Mo.) in the wash buffer (PBS).

Serial Dilution of Avidin in Serum to Determine Nonspecific Protein Binding Interference.

A serial dilution of normal Atlantic serum was conducted with 7.5 µL/mL of avidin added in PBS. Normal serum was spiked with avidin and diluted by a factor of ten from 1:10 to 1:10,000. Each dilution was added to microplate wells in duplicate. After 100 µL of solution was pipetted into the microplate wells, the plates were incubated for 45 minutes at room temperature. The plates were then washed five times with distilled water and blocked with casein for 40 minutes. After incubation, 100 µL of biotin conjugated with horseradish peroxidase (HRP, Pierce, Rockford, Ill.) as the second antibody, was added to each well either with or without Tween 20 (50 µL Tween/1.4 mL biotin-HRP), and the plate was incubated for 20 minutes. The plate was then washed as before, and TMB substrate was added. Absorbance readings were taken immediately, and at five minute intervals for 40 minutes.

Molecular Marking of Atlantic Salmon Fry

To test for the natural presence of bovine serum albumin in wild sea-run Atlantic salmon, serum was collected from 90 sea-run adult fish during their migration into spawning rivers. The serum was tested by the standard ELISA method far bovine serum albumin from fish returning to one of three river systems: 45 fish in the Connecticut River, 23 fish from the Penobscot River, and 22 fish from the Merrimack River.

Groups of 200 Atlantic salmon fry were exposed to 0.8, 1.6, and 3.1 µg/ml bovine serum albumin in baths, three bath concentrations (0.08, 0.15, and 0.30 µg/mL of bovine serum albumin) of BSA Supercarrier (Pierce, Rockford, Ill.) with the hapten DNP, or to avidin horseradish peroxidase complex (HRPAv) at 0.60, 0.30, and 0.10 µg/mL. Two groups of fish (three replicates of each treatment) were exposed to each treatment, one each eight days before, and one day before yolk absorption. The fish were immersed in each bath for five minutes at 8.3° C., using egg incubation trays filled with five liters of water. After the bath treatment, the fish were reared in 8–10° C. water in 40 liter tanks (half tanks) for 16 months, then in 80 liter glass tanks with flow through water supplied at four liters/minute. The second group of Atlantic salmon swim up fry were randomly selected into twelve groups of 300–400 fish each and placed into one of three replicates each of four treatments, which were exposed by bath immersion in either 20 µg/mL bovine serum albumin in the first bath and 3.0 µg/mL or 1.5 µg/mL avidin-fluorescein complex (FITC-Av) second bath. The treatment combinations were 20 µg/mL bovine serum albumin (BSA) and 3.0 µg/mL FITC-Av; 20 µg/mL BSA and 1.5 µg/mL FITC-Av; 10 µg/mL BSA and 3.0 µg/mh FITC-Av; and 10 µg/mL BSA and 1.5 µg/mL FITC-Av. Immersion lasted ten minutes for each bath with a two minute rinse in between. The fish were then placed in rearing units.

At 15, 24, and 30 months exposure, 10 fish per treatment replicate were anesthetized in tricaine methane sulfonate and blood was drawn from the caudal vessels. The blood was refrigerated overnight, centrifuged for eight minutes at 13,000 rpm the next day, and the serum recovered was stored frozen. Serum samples were measured by fluorometry for FITC-Av, and ELISA was used for BSA determination. To perform the fourescence assay, 100 µL/well of serum were placed into 96-well black round bottom plates (Dynatex, Chantilly, Va.) and fluorescence emittance was measured on an HTS 7000 fluorometer (Perkin Elmer, Norwalk, Conn.). Preliminary standards were performed with black, white, and membrane unifilter GF/B plates (Dynex Techcnologies, Chantilly, Va.) to determine the lowest background interference for Atlantic salmon serum. Serial dilutions of serum and FITC-Av were performed to determine the sensitivity of the instrument with each type of plate. Black plates had the lowest background interference and allowed the greatest sensitivity. When compared to negative control Atlantic salmon serum, 0.0006 µg/ml FITC-Av in serum still showed a positive result.

The standard ELISA procedure included the use of four positive control groups of PBS with BSA added at one of four concentrations: 1.0, 0.50, 0.25, and 0.10 mg/mL. One negative control group of a 1:1 ratio of Atlantic salmon serum to PBS was used. The controls and the serum samples were plated at 100 µL well and incubated in a refrigerator for 24 hours. The ELISA was performed as above.

The assays differed for analysis of each chemical mark. In every case, however, four groups of PBS with BSA added at of four concentrations: 1.0, 0.50, 0.25, 0.10 mg/ml, served as positive controls. One negative control was used of a 1:1 ratio of Atlantic salmon serum to PBS. The controls and the serum samples were plated at 100 µL well and incubated in a refrigerator for 24 hours. The BSA standard ELISA method as above was used. HRP-Av samples required only blocking with casein, and addition of TMB substrate to react with HRP-Av in the serum. The absorbance was measured in the ELISA reader. The assay procedure for BSA (BSA Supercarrier and BSA/FITC-Av) included blocking with casein, washing with PBS-Tween, then incubation for 45 minutes with $\frac{1}{1000}$ monoclonal mouse anti-BSA antibody (MaBSA, Sigma, St. Louis, Mo.). The plates were again washed with PBS-Tween, biotinylated goat anti-mouse antibody (B-GaM, Pierce, Rockford, Ill.) added and the plates were incubated for 45 minutes. After washing with PBS-Tween, ABC complex was used to bind to biotin on B-GaM for 20 minutes. The plates were washed, TMB substrate added, and the absorbance was read.

Statistical Analysis

The statistical analysis was calculated from single mean values derived from all duplicate pairs. The one way analysis of variance was used to show significant differences between biotin-avidin formation in blood and in serum and the Friedman ranked two-way analysis of variance to find differences among response to the BSA/FITC-Av chemical complex formed in the fish. Duncan's New Multiple Range Test was used to determine differences among means. Absorbances in serial dilutions were plotted to show differences among absorbances resulting from dilutions. The decisions rule for all statistical tests was set at $p=0.05$.

As demonstrated above, the B-BSA-avidity-enzyme complex forms a readable mark in Atlantic salmon or blood serum. By using this method, one can produce a retrievable biochemical mark. When many marks are applied, different groups of fish can be identified. The lowest detectable levels of AV-B-BSA complex in vitro in serum (1.88 µg/mh) provided a basis for determining dosage for bath treatments for fish, and defines some limits to sensitivity in in vivo recognition of the stock identification marker. The method of the present invention can be used with larval, or pre-feeding fish, or those fish which are too small to accept juvenile fish tagging methods such as fin clips, hot or cold brands, coded wire tags, elastorner tags, or fluorescent sprays. (Bandow 1987, Negus et. al. 1990, Yunk and Cook 1991, Thedinga and Johnson 1995, Moffett et al. 1997, Dussault and Rodriguez 1997).

The mark of the present invention is easily retrieved, and there is no necessity for lethal sampling methods, as is the case with otolith marks or rare earth element markers (Younk and Cook 1991, Nielsen 1992, Schroder et al. 1996). The methods for applying the mark of the present invention, i.e., a five minute bath exposure and rinse, are simpler than those for calcein fluorescent markers, which may require exposures for up to 48 hours in a recirculating chemical bath to provide a successful mark (Gelsleichter et al. 1997, Mohler 1997). The biochemical marking method of the present invention is useful as a batch marking method. With different tags on the BSA, the method can be used to mark several groups; such as families. While the marker of the present invention may not be as useful as current genetic methods which can be used for genetic analysis of families, the method of the present invention does not require a search for suitable alleles and sampling of both parents and progeny. Moreover, genetics procedures require the use of sophisticated equipment and genetics expertise to interpret results (Nielsen 1992), and evaluation of genetic markers is costly. The biochemical batch marking method of the present invention provides a very low cost alternative to genetic procedures.

BSA remains in the blood of Atlantic salmon for over 30 months when a five minute bath at a concentration of at least 3.1 pg/mL B-BSA is used. It was also found that lower concentrations of "cationized" BSA in Supercarrier (Pierce, Rockford, Ill.) were effective at very low concentrations 0.08 0.30 $\mu$g/mL) with mark retention up to 15 months (88%), but was less effective at 24 months (67%). These concentrations may be too low for continued detection within the blood as the fish grows.

In forming biochemical complexes of B-BSA/FITC-avidin in vivo, it was found that either the complex did not form well within the fish or the immune system picked up the avidin and cleared it from the system, resulting in lower retention rates than with the use of BSA alone. The complete inability to find avidin after 15 months in all three groups of fish marked with avidin indicates that the immune system may remove avidin from the blood stream. However, Atlantic salmon tolerate BSA well, and the BSA remains for periods of at least 30 months.

The humoral immune system is functioning by the time fish begin feeding, so it is to be expected that pre-feeding larval salmonid fish could take up and process an antigen tagged as a stock identification marker. The Atlantic salmon has membrane IgM at first feeding, indicating a functional humoral immune system (Ellis 1977), and the chum salmon, Oncorhynchus keta, has rapidly increasing IgM concentrations at first feeding (Nagae et al., 1993). The rainbow trout, Oncorhynchus mykisszs, is said to have peak IgM at hatching (Castilo et al. 1993) and is able to produce a titer at one month post-hatch (Tatner 1986). Because the immune system is functional in salmonids at this age, it appears that the tolerance to biological chemicals considered as foreign to the immune systems indicates that the use of tolerant chemicals will provide long lasting markers, even in fish marked at an older age.

The in vitro tests conducted as described herein demonstrated that the biotin-avidin complex will form in the serum of salmonids and provides a method for biochemically tagging small fish or other animals. It was found that 85–90'of Atlantic salmon fry exposed to B-BSA prior to their first feeding can retain recognition of their history of exposure to the protein for over two years. The protein tags (biotin or fluorescence, etc.) make it possible to find the protein readily within the fish's blood stream. Since efficiency of tag recognition of less than 100% is a characteristic of chemical tags (Nielsen 1992), 100% tag retention is not expected for large groups of fish analyzed.

The foregoing description of the specific embodiments will so fully reveal the general nature of the invention that others can, by applying current knowledge, readily modify and/or adapt for various applications such specific embodiments without departing from the generic concept, and, therefore, such adaptions and modifications should and are intended to be comprehended within the meaning and range of equivalents of the disclosed embodiments. It is to be understood that the phraseology or terminology employed herein is for the purpose of description and not of limitation.

What is claimed is:

1. A method for marking animals for subsequent identification comprising exposing the animals to a protein that does not react with the animals immune system wherein said protein contains a detectable marker, said marker being a fluorescent dye.

2. The method according to claim 1 wherein the protein is bovine serum albumin.

3. The method according to claim 1 wherein the animals are fish which are exposed to immersion in a solution of the protein.

4. The method according to claim 3 wherein the fish are salmonids.

5. The method according to claim 1 wherein the marker is present in the blood stream of the animals.

* * * * *

UNITED STATES PATENT AND TRADEMARK OFFICE
CERTIFICATE OF CORRECTION

| | | |
|---|---|---|
| PATENT NO. | : 6,949,508 B1 | Page 1 of 1 |
| APPLICATION NO. | : 10/401973 | |
| DATED | : September 27, 2005 | |
| INVENTOR(S) | : William F. Krise and John L. Sternick | |

It is certified that error appears in the above-identified patent and that said Letters Patent is hereby corrected as shown below:

Title page:
Item (54), Title, "MOLECULAR TAG READER" should read --EASY READ MOLECULAR TAG--.

Signed and Sealed this

Sixth Day of March, 2007

JON W. DUDAS
*Director of the United States Patent and Trademark Office*